(12) United States Patent
Perich et al.

(10) Patent No.: US 7,407,638 B1
(45) Date of Patent: Aug. 5, 2008

(54) ON-DEMAND LEAD AZIDE PRODUCTION

(75) Inventors: Andrew Perich, Vernon, NJ (US); Emily A. Cordaro, Mt. Arlington, NJ (US); Gartung Cheng, Edison, NJ (US); Neha Mehta, Sucasunna, NJ (US); Daniel Stec, III, Long Valley, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 122 days.

(21) Appl. No.: 10/906,623

(22) Filed: Feb. 28, 2005

(51) Int. Cl.
*C01B 21/06* (2006.01)
(52) U.S. Cl. .................................................. 423/410
(58) Field of Classification Search .................. 423/410
See application file for complete search history.

(56) References Cited

U.S. PATENT DOCUMENTS 1,959,731 A * 5/1934 Meissner .................... 423/410
3,095,268 A * 6/1963 Lindner et al. .............. 423/410
4,954,329 A * 9/1990 Klossner et al. ............. 423/410
2006/0183956 A1* 8/2006 Heaton .......................... 588/1

OTHER PUBLICATIONS

Yin et al; "Numerical computation of blast wave parameters of initial explosive in steel blast-preventing container", Proceedings of the International Pyrotechnics Seminar (1998), 24th, 613-619. (Abstract only), no month.*

* cited by examiner

*Primary Examiner*—Wayne A. Langel
(74) *Attorney, Agent, or Firm*—John Moran

(57) ABSTRACT

The present invention discloses a process for the on-demand production of small quantities of lead azide. First, a metered quantity of sodium azide solution and a metered quantity of a solution of a lead salt sufficient to react with the sodium azide are introduced into a T-mixer or Y-mixer. Then, the sodium azide and lead salt solutions are conveyed into a static mixer and the azide and lead compounds are permitted to react together, forming insoluble crystals of lead azide as a slurry in an aqueous medium. The lead azide crystals are then separated from the aqueous medium. The process is carried out within an explosion-proof chamber.

2 Claims, 1 Drawing Sheet

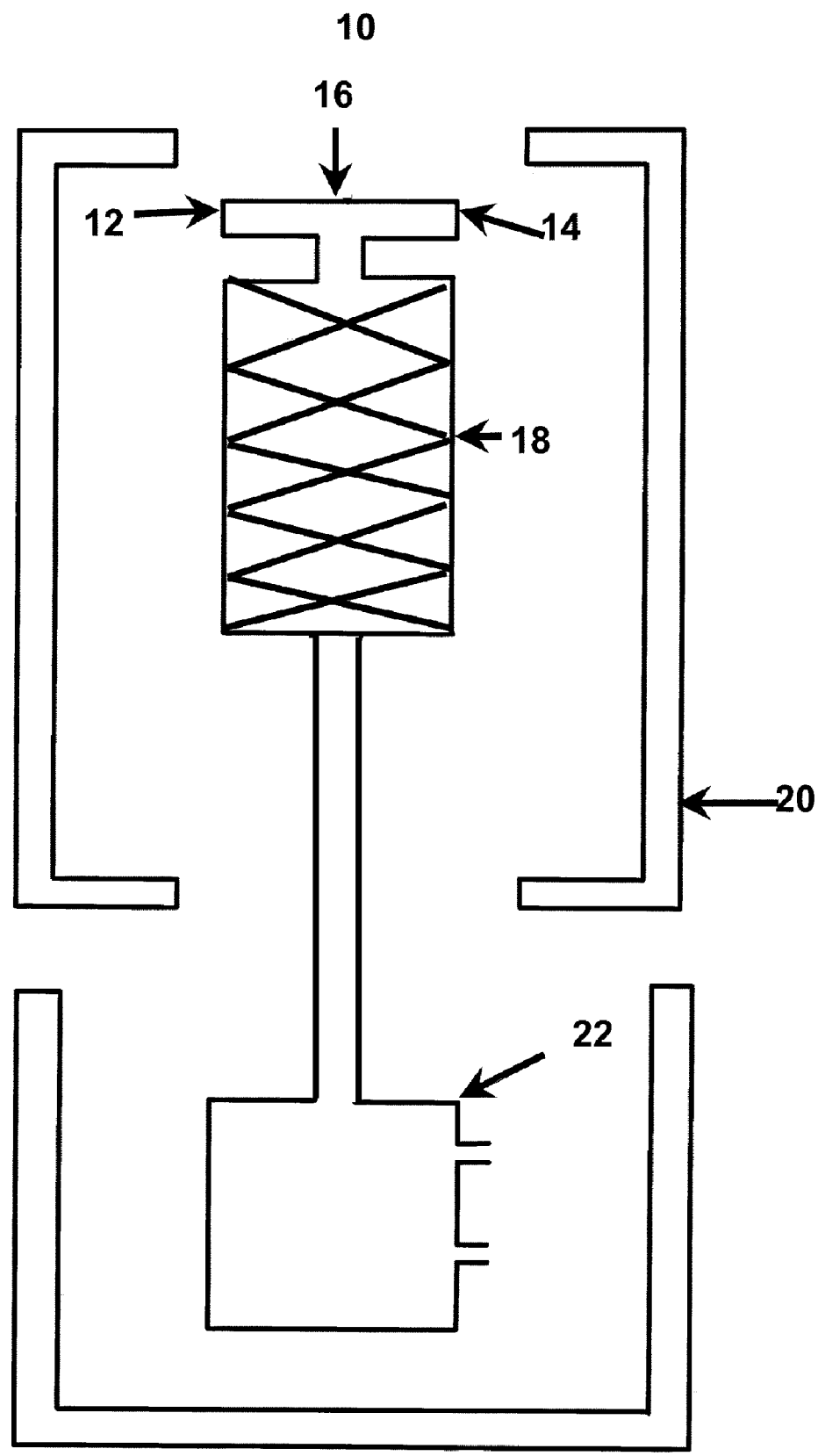

ON-DEMAND LEAD AZIDE PRODUCTION

FEDERAL RESEARCH STATEMENT

The invention described herein may be made, used, or licensed by or for the United States Government for Government purposes without the payment of any royalties thereon or therefore.

BACKGROUND OF THE INVENTION

1. Field of the Invention

The present invention relates to a process for the on-demand production of small quantities of lead azide. In particular, the present invention relates to a process for the on-demand production of small quantities of lead azide, said process comprising the steps of:

in a reactor assembly, introducing a metered quantity of an azide component comprising sodium azide solution and a metered quantity of a lead component comprising a solution of a lead salt sufficient to react with said azide component into a primary mixing chamber that may be in the form of a T-mixer or Y-mixer;

conveying said azide component and said lead component into a static mixer;

permitting said azide component and said lead component to react together, forming insoluble crystals of lead azide as a slurry in an aqueous medium; and, separating said lead azide crystals from said aqueous medium, wherein the process is carried out within at least one explosion-proof chamber.

2. Description of Related Art

Lead azide remains a required component in the detonation, and the detonators, of nearly every type of munitions. Unfortunately, however, lead azide is no longer produced in the United States. The Department of the Army's existing stockpile of lead azide is stored at Lone Star AAP. A recent study showed that the material could recrystallize under long-term storage conditions, causing potentially dangerous changes in sensitivity and performance. Recent analyses of samples of stockpiled lead azide have identified batches with such modified crystals.

Traditional commercial production of lead azide has required stainless steel mixing kettles, air-driven agitation, and safety barricades in a dedicated facility, with all the capital costs, which are attendant to such requirements. Commercial production is typically carried out in a batch process, with a typical production being three and a half kilograms (3.5 kg) in a sixty-liter (60L) stainless steel kettle. Production is based upon simple chemistry in which an aqueous solution of a lead salt, typically lead (II) acetate or nitrate, is mixed with an aqueous solution of sodium azide. The reaction is essentially instantaneous, and the lead azide product precipitates out.

Because lead azide is so unstable, however, and because other metal azides can result that are even more unstable, the manufacturing process is dangerous. Further, the presence of lead, a heavy metal, creates environmental risks and regulatory issues.

BRIEF SUMMARY OF THE INVENTION

Objects of the Invention

It is an object of the present invention to provide a streamlined, on-demand process for the production of small quantities of lead azide.

The other objects, features and advantages of the present invention will become more apparent in light of the following detailed description of the preferred embodiment thereof.

SUMMARY OF THE INVENTION

According to the present invention, there is provided a process for the on-demand production of small quantities of lead azide, said process comprising the steps of:

in a reactor assembly, introducing a metered quantity of an azide component comprising sodium azide solution and a metered quantity of a lead component comprising a solution of a lead salt sufficient to react with said azide component into a T-mixer or Y-mixer;

conveying said azide component and said lead component into a static mixer;

permitting said azide component and said lead component to react together, forming insoluble crystals of lead azide as a slurry in an aqueous medium; and, separating said lead azide crystals from said aqueous medium, wherein the process is carried out within at least one explosion-proof chamber.

BRIEF DESCRIPTION OF THE DRAWINGS

The FIGURE shows a schematic of the static mixer reactor of the present invention.

DETAILED DESCRIPTION OF THE INVENTION

The present invention provides a simple manufacturing process to safely produce small quantities of lead azide. This process is unique and demonstrates several advantages over the larger batch process known to the prior art. These advantages include economics, safety and reproducibility. The present process utilizes commercial, of-the-shelf equipment and components, and semi-continuous processing techniques that allow for a minimum quantity of lead azide to be present in the reactor at any time, increasing process safety. The process can be carried out in one or more explosive blast chambers. The chambers are small enough to fit on a mobile cart, and designed to contain the effects of a detonation. The overall size and simplicity allows for either permanent installation, or roll-in/roll-out usage, of the equipment and process on-site at ammunition loading plants, and the like, so that lead azide can be produced as needed, eliminating the need for storage and transportation.

According to the present invention, there is provided a process for the on-demand production of small quantities of lead azide. This process, as illustrated in the FIGURE, comprises the steps of:

in a reactor assembly 10, introducing a metered quantity of an azide component 12 comprising sodium azide solution and a metered quantity of a lead component 14 comprising a solution of a lead salt sufficient to react with said azide component 12 into a T-mixer or Y-mixer 16;

conveying said azide component 12 and said lead component 14 into a static mixer 18;

permitting said azide component 12 and said lead component 14 to react together, forming insoluble crystals of lead azide as a slurry in an aqueous medium; and, separating said lead azide crystals from said aqueous medium, wherein the process is carried out within at least one explosion-proof chamber 20.

In the preferred embodiment on the present invention, a commercial, off-the-shelf static mixer has been used advantageously as a reaction vessel. A static mixer is, typically, a plug flow-style reactor into which mixing elements, or baffles, have been introduced. These elements are non-moving, and disrupt the flow of the liquid(s) in the tube, causing mixing to occur. Static mixers have a number of advantages over stirred reactor vessels.

One of the chief advantages of a static mixer is safety. Only a few grams of lead azide are being produced at any given time. Another advantage is the excellent mixing characteristics of such mixers. Additionally, it is believed that the process of the present invention will have a substantial economic advantage: the various components utilized by the present process are small, have no moving parts, are inexpensive and are easily replaced. Because of the small volume of reacting mixture at any given time, temperature control requirements should be modest. Finally, the process will have a high throughput for the reduced equipment size requirements.

The FIGURE shows a schematic of the static mixer reactor design. The two reacting solutions, the azide component 12 and the lead component 14, are separately metered into a T-mixer or Y-mixer 16 and flow directly into a static mixer 20. Lead azide forms inside the static mixer 18 and is flushed out by the carrier water flow. The static mixer 18 is positioned vertically to preclude any settling of lead azide to the bottom of the tube during production. To prevent the unwanted reaction of the azide ion with metals other than lead, and the danger of forming metal azides, which might be more sensitive than, lead azide, all wetted parts are preferable made from a plastic material.

The lead azide final product flows out of the reactor containment tank 20 into a filtration system 24, in a containment vessel 22, where the lead azide product material is separated from the aqueous reaction stream. At the conclusion of the reaction period, the reactor and the lead azide product are automatically flushed with water for cleaning, and to remove any reaction by-products. Process modifiers and processing aids, such as sodium carboxymethylcellulose, polyvinyl alcohol, surfactants, and the like, can be present as soluble components in none, one, or both of the reactant streams.

One skilled in the art will recognize that all of the reactor components may be housed within a single protective environment, such as an explosion-proof chamber. For greater safety, however, it is regarded as a safety feature to separately shield the reaction components from each other.

Finally, a chemical process such as the one illustrated and claimed, can be automated using the Model-Based Control (MBC) technology of U.S. patent application Ser. No. 10/064,542 filed Jul. 25, 2202, pending, Ser. No. 10/707,897 filed Jan. 20, 2004, U.S. Pat. No. 7,138,691, Ser. No. 10/707,882 filed Jan. 20, 2004, abandoned, and Ser. No. 10/707,881 filed Jan. 20, 2004, abandoned, the disclosures of which are hereby incorporated by reference as if they were set out completely herein. Once the particular process "recipe" is determined, it is programmed into a computer that utilizes the MBC to reproduce the exact process conditions at all installation sites, resulting in reproducible lead azide production. Use of the MBC technology for reproducible process control is not limited to multi-site production of lead azide, however. The MBC technology can be easily modified for the production of other specialty energetic and non-energetic materials essential for the fabrication of a variety of munitions systems.

Other features, advantages, and specific embodiments of this invention will become readily apparent to those exercising ordinary skill in the art after reading the foregoing disclosures. These specific embodiments are within the scope of the claimed subject matter unless otherwise expressly indicated to the contrary. Moreover, while specific embodiments of this invention have been described in considerable detail, variations and modifications of these embodiments can be effected without departing from the spirit and scope of this invention as disclosed and claimed.

What is claimed is:

1. A process for the on-demand production of small quantities of lead azide, said process being carried out in a reactor assembly within one or more explosion-proof chambers, said reactor assembly comprising:

means for providing a first stream of water into which a metered amount of an azide component comprising sodium azide may be introduced;

means for providing a second stream of water into which a metered amount of a lead component comprising a solution of a lead salt may be introduced;

means for combining said first stream of water with said second stream of water, which means comprises a T-mixer or a Y-mixer having no moving parts;

a static mixer in which said azide component and said lead component may react without stirring; and, means to separate insoluble crystals of lead azide as a slurry from an aqueous medium;

said process comprising the sequential steps of:

providing a first stream of water and introducing into said first stream of water an azide component comprising sodium azide through the effect of the first stream providing means;

providing a second stream of water and introducing into said second stream of water a lead component comprising a solution of a lead salt sufficient to react with said azide component introduced into said first stream of water, said second stream providing being performed through the effect of the second stream providing means, whereby said resulting streams are combined to form a reaction mixture, wherein said reaction mixture is produced in the combining means through the effect of the T-mixer having no moving parts or the Y-mixer having no moving parts;

conveying said reaction mixture into the static mixer and permitting said azide component and said lead component to react together without stirring, forming insoluble crystals of lead azide as a slurry in the aqueous medium; and separating said lead azide crystals from said aqueous medium.

2. A process for the on-demand production of small quantities of lead azide, said process comprising the steps of:

in a reactor assembly, introducing a metered quantity of an azide component comprising sodium azide solution and a metered quantity of a lead component comprising a solution of a lead salt sufficient to react with said azide component into a mixer thereby forming a reaction mixture consisting of the two solutions, said mixer being one selected from the group consisting of: a T-Mixer having no moving parts and a Y-Mixer having no moving parts;
conveying said reaction mixture into a static mixer;
permitting said azide component and said lead component of the reaction mixture to react together, forming insoluble crystals of lead azide as a slurry in an aqueous medium; and,
separating said lead azide crystals from said aqueous medium, wherein the process is carried out within at least one explosion proof chamber.

\* \* \* \* \*